Patented May 9, 1933

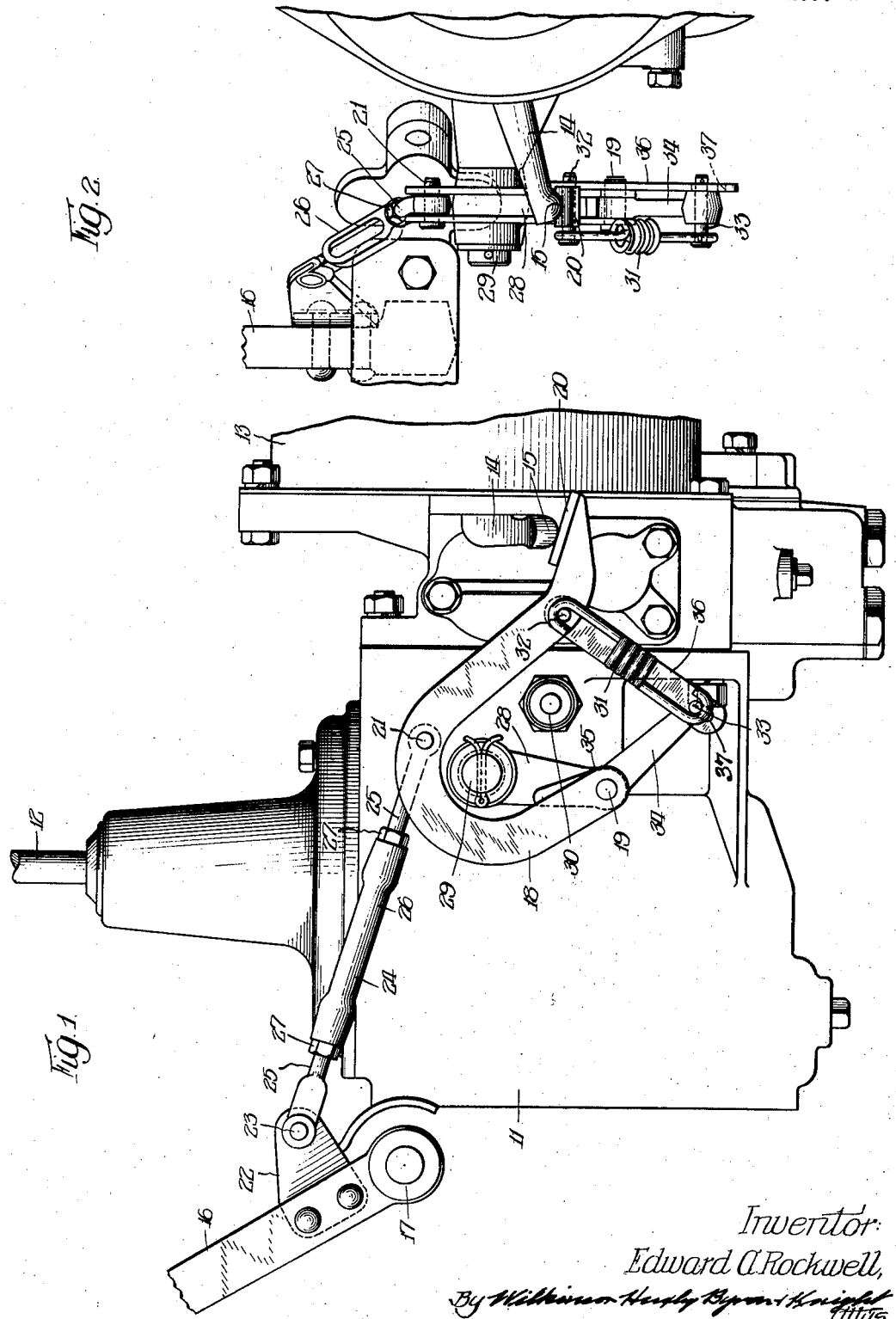

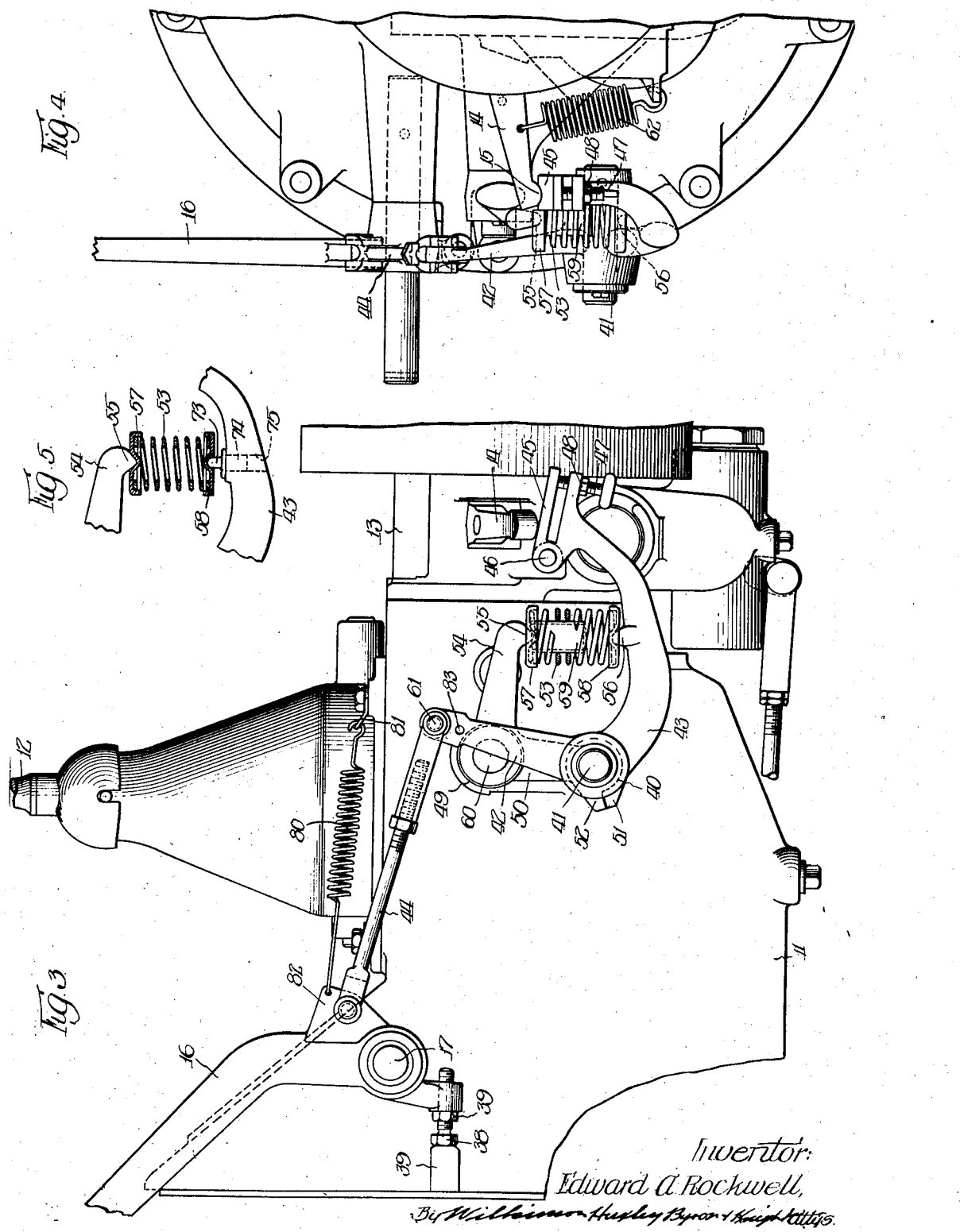

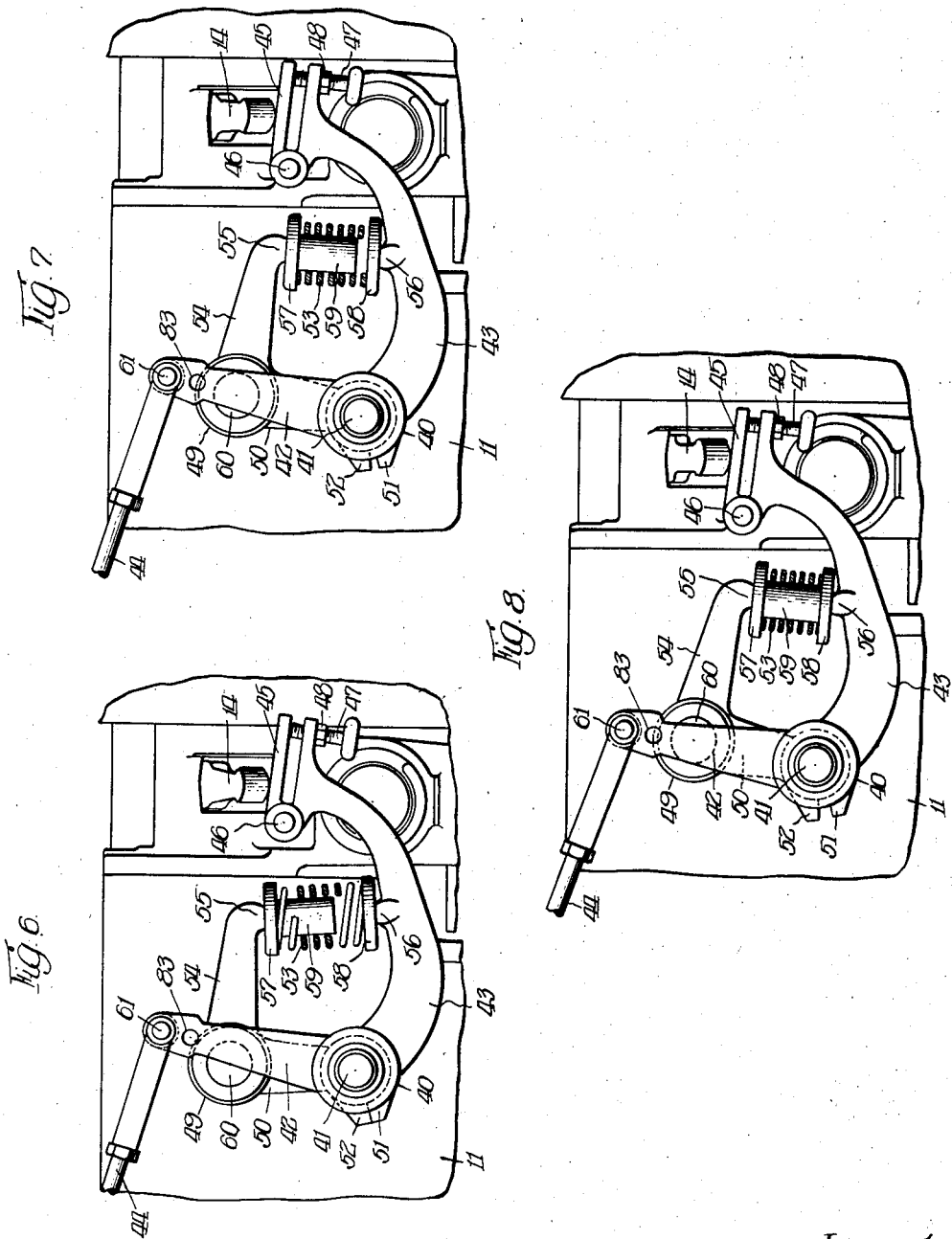

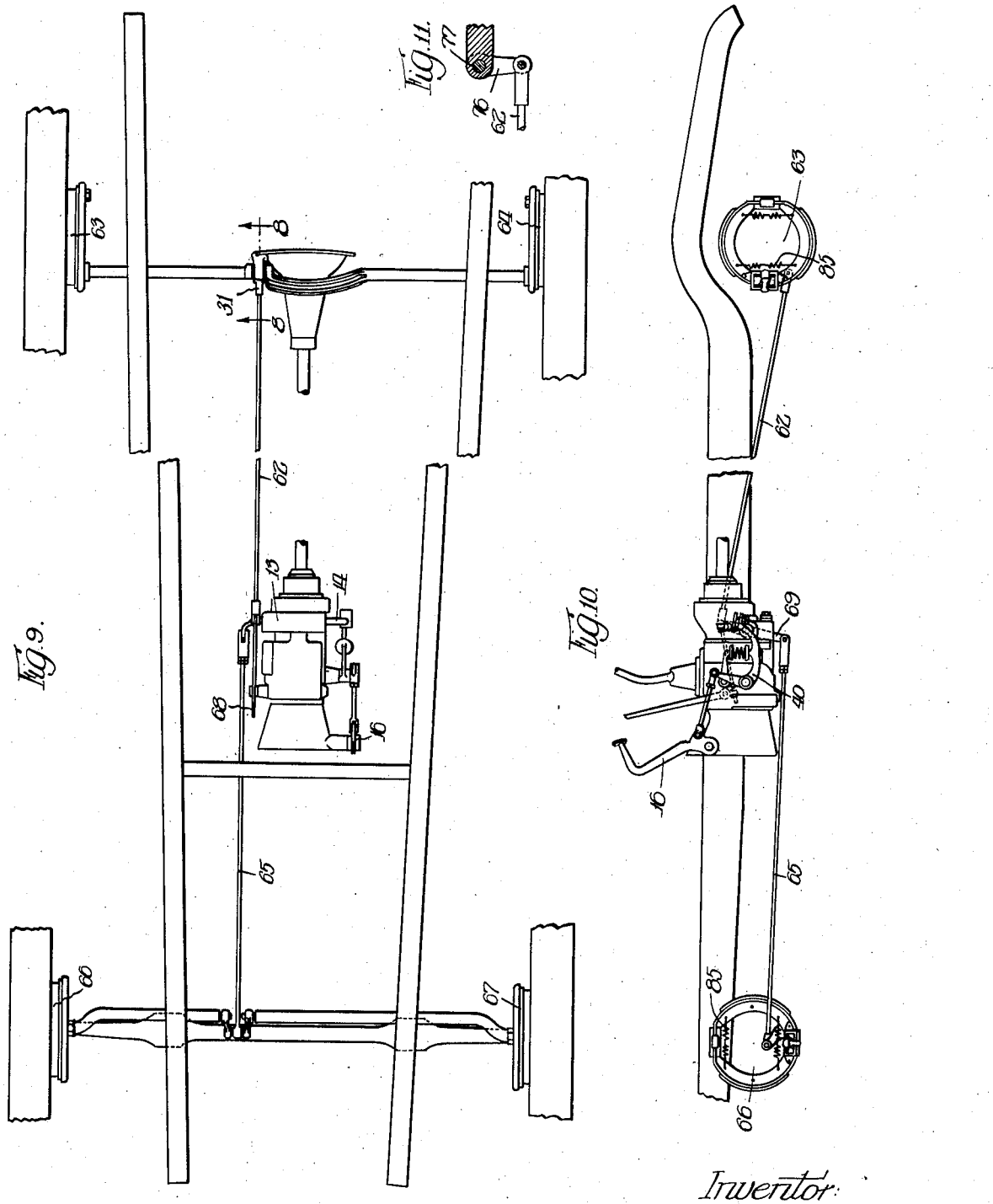

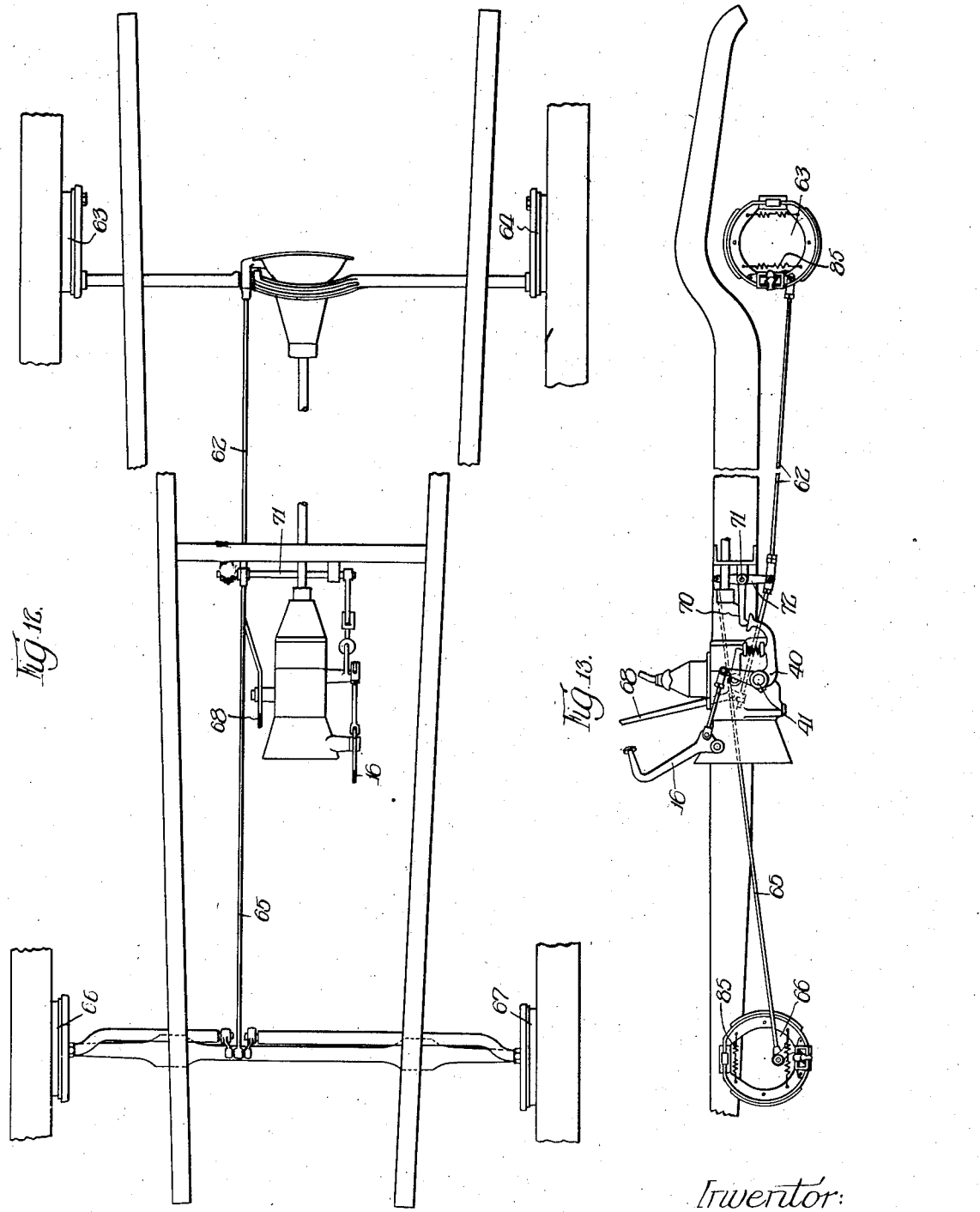

1,907,876

UNITED STATES PATENT OFFICE

EDWARD A. ROCKWELL, OF CHICAGO, ILLINOIS

BRAKE APPLYING MEANS

Application filed May 22, 1929. Serial No. 365,070.

This invention relates to new and improved brake operating mechanism and more particularly to such mechanism which is associated with the brake pedal and adapted to provide a varying resistance to the operation of the pedal during the operating movement thereof.

The present improvements are especially designed to be utilized in connection with motor vehicles in which the brake pedal has customarily several inches of stroke in order to apply the brakes but it may be used with other types of brake control. In such a construction it is highly desirable that the pedal pressure, as applied by the operator, may be so varied by the brake linkage that an increasing resistance is presented as the brake pedal is moved whereby a sudden application of the brakes is prevented. This is especially true when the movement of the brake pedal is transmitted to a power device for operating the brakes. In the use of a power device a very slight pressure is required to actuate the power arm and thereby there is danger that the operator may too quickly actuate a power device and cause the sudden application of the brakes.

It is an object of the persent invention to provide a construction of brake linkage initially actuated by a pedal or other form of control, the linkage serving to transmit a thrust preferably to an input arm of a power brake device, but it may instead impart a direct thrust to the wheel brake rods. The pedal movement and pressure is transmitted in three phases. During the initial movement of the pedal, the arm which extends to the power device is directly moved until the slack is taken up in the movement of the brake shoes, brake band, or other means of developing a frictional resistance in the power brake device. The engagement of the friction members in the power brake device will cause the wheel brakes to be applied with an initial light pressure. From this position the input arm of the power brake device can have only a very slight further movement. The second phase then begins during which the movement of the pedal will be absorbed either in compressing a compression spring or in lengthening a tension spring. The thrust pressure upon the input arm of the power brake device will, therefore, be independent of the pressure which is being applied to the pedal and will only increase as the resistance of the spring increases proportionate to the pedal movement. Thus by providing a spring with a definite rate per coil, the desired increase in the braking pressure will be obtained. Finally the third phase occurs when stop means prevents further compression or extension of the spring or when the compression spring is tightly closed and further application of pressure to the pedal will not result in movement of the brake linkage but imparts a direct thrust to the input arm of the power brake device which increases in direct portion to the pedal pressure. The change from the second to the third phase will depend upon the final resistance of the spring which may be made such that there is not an abrupt change in the thrust pressure developed upon the power input arm. Such a construction results in a smooth and efficient application of the wheel brakes.

It is further an object of the present invention to provide a construction of brake linkage including a brake applying lever which is carried by a pivot on a secondary lever pivoted about a fixed point and in which the spring resistance means between the brake applying lever and secondary lever to obtain the modulation of the brake applying force consists of a compression spring of helical form having a rectangular cross section. It has been found that such a spring will give more advantageous results than the usual helical spring of a circular section. Further, such a spring, when closely compressed, will serve as means to prevent further relative movement between the levers and additional stop means is not needed.

It is further an object of the present invention to design the construction in such a manner that a longer or shorter pedal movement may be had by merely changing the spring without effecting the application of the braking pressure to the wheel brakes from the power unit.

It is further an object of the present invention to provide mechanism of the above mentioned type which may be readily installed on standard types of motor vehicles and which is so designed that adjustments of the operating members may be readily carried out.

Other and additional objects and advantages of the improvements will be more readily apparent as the description proceeds, taken in connection with the attached drawings, in which—

Figure 1 is a fragmentary side elevation of the assembled mechanism illustrating a preferred embodiment as applied to a standard type of motor vehicle.

Figure 2 is a vertical elevational view from the right hand end of Figure 1.

Figure 3 is a view similar to Figure 1 but showing a modified form of construction.

Figure 4 is a vertical elevation from the right hand end of Figure 3.

Figure 5 is a detail view partially in section showing a modified form of spring resistance means in which a removable lug is provided to enable different sizes of springs to be used.

Figures 6, 7, and 8 are fragmentary vertical elevations of the brake linkage illustrated in Figure 3 and show three different positions of the levers during the operation of the brakes.

Figure 9 is a somewhat diagrammatic view in plan of a chassis frame illustrating the application of the brake linkage, as shown in Figures 6 and 7, when a power device is used.

Figure 10 is a side elevation of the mechanism shown in Figure 9.

Figure 11 is a detail view illustrating the connection of the rear brake rod to the transverse brake operating rod taken on line 8—8 of Figure 9.

Figure 12 is a substantially diagrammatic plan view of a chassis frame illustrating the application of the brake linkage shown in Figures 3 and 4 when it is directly imparting a thrust to the brake operating members.

Figure 13 is a diagrammatic side elevation of the mechanism shown in Figure 12.

First having reference to the modification shown in Figures 1 and 2, a customary transmission housing is indicated at 11 from the upper end of which extends a gear shifting lever 12 of the usual type. The housing 13 encloses power brake applying means which may be of the type disclosed in my co-pending application Serial No. 224,286, filed October 8, 1927. From the housing 13 extends an operating arm 14 including a rounded toe 15 to which the pressure is transmitted to operate the power brake applying means. A brake pedal lever 16 is pivotally supported on pintle bearing 17. A U-shaped brake applying lever 18 is mounted on the pivot 19 at one end and includes at its other end an operating face 20 which is designed to bear against the rounded toe 15 of the power operating arm. At an intermediate point on the U-shaped lever 18 is a pivot stud 21, while the brake pedal lever 16 has secured thereto an extension flange 22 having a pivot 23. Between the pivots 21 and 23 extends an adjustable link connection 24. As shown, the link connection is of a customary type including rods 25 having oppositely threaded ends to which is secured the turnbuckle 26, whereby the rotation of the turnbuckle 26 will tend to shorten or lengthen the linkage between the pivots 21 and 23. Adjusting nuts 27 are provided to hold the turnbuckle 26 in a fixed position.

It will be noted that the pivot 19 is not a fixed pivot but extends from an intermediate lever 28 which is mounted on a pivot stud 29. The stud 29 may be suitably mounted on the transmission housing 11.

As stated, it is desired that the mechanism may be so designed that it may be applied to a standard type of motor vehicle. Thus a present design of vehicle includes a speedometer connection 30 extending from the transmission housing and it is, therefore, desirable to use the U-shaped form of the lever 18 in order to avoid interference with such speedometer connection.

A tension spring 31 is arranged to extend from a transverse pin 32 which is mounted in a portion of the lever 18 intermediate the contact face 20 and the pivotal connection 21. The spring 31 is attached at its lower end to a pin 33 which is mounted in an extension arm 34 integral with the arm 28. The pins 32 and 33 extend through their respective lever arms whereby a slotted link 36 is held in place. The link 36 closely fits the pin 32 but has at its lower end an elongated slot 37 to receive the pin 33. Thus limited resilient movement is permitted between the brake applying lever 18 and the bell crank lever 35 comprising the arms 28 and 34.

In the operation of the brake linkage illustrated in Figures 1 and 2, the tension spring 31 is initially stiff whereby the movement of the pedal lever will first swing the lever 18 together with the bell crank 35 about the fixed pivot 29. The thrust engagement between the contact face 20 and the rounded end 15 of the power arm 14 will cause the arm 14 to move and bring the brake shoes within the power unit into engagement with the power brake drum. It will be apparent that any suitable friction means may be utilized within the power brake unit in order to effect the operation which will transmit a braking force to the wheel brakes. After the frictional members within the power unit have been brought into engagement by the movement of the arm 14, further movement of the pedal will not result in a corresponding movement of the arm 14, instead, the movement of the pedal lever will be absorbed in extending the tension spring 31 and it will be apparent that the force exerted upon the arm 14 will be dependent upon the resistance of the spring 31 to extension. During the extension of the spring 31, the contact face 20 will slide relative to the rounded end 15 and the pivot 19 will move in a clockwise direction about the fixed pivot 29 while there is a relative movement between the lever 18 and the bell crank lever 35. However, when further relative movement is prevented by the engagement of the pin 33 with the lower end of the slot 37, the levers 18 and 35 will then tend to move as a unit and the pressure upon the pedal will be transmitted directly to the power arm 14. During the time that the movement of the pedal lever is extending the spring 31, it is apparent that the effective input leverage would be the distance from the pivot 19 to the axis of the connection link 24, but the final effective leverage will be reduced to the distance from the pivot 29 to the axis of the connecting link 24. Therefore the operator must develop a pedal pressure to directly transmit a thrust pressure to the power arm 14 that is greater than the spring resistance. By this arrangement it is possible to allow the customary several inches of stroke to the pedal lever but to substantially control the application of the brakes by the resistance of spring 31, however, the operator may, by increasing the pedal pressure, transfer the resilient thrust upon the arm 14 to a direct thrust so that, if desired, an emergency stop may be made without depending upon the smooth application of the brakes by the control of the spring 31.

In the embodiment shown in Figures 3 and 4, the transmission housing 11, shifting lever 12, power brake housing 13, arm 14 having a rounded end 15, brake pedal lever 16 mounted on the pintle bearing 17, are all shown substantially as before. In this embodiment the pedal lever 16 is provided at its lower end with an adjustable stop 38 which bears against a fixed abutment 39 to limit the upward movement of the pedal lever 16. The stop 38 is adjusted by the nut 39. A bell crank brake-applying lever 40 is shown mounted on the pivot 41 and includes an upwardly extending arm 42 and a substantially horizontally extending arm 43. Between the pedal lever 16 and the arm 42 of the bell crank 40 extends an adjustable connection link 44 attached to the arm 42 at pivot 61. The arm 42 may have an additional opening such as 83 to which the connecting link 44 may be attached to vary the leverage if a different pedal movement is desired. The operating end of the arm 43 has an improved design in that a bearing plate 45 is pivoted to the arm 43 by the stud 46 and is adjusted in its position by the screw 47 which is threaded into the end of the arm 43 and may be held in its position by the adjusting nut 48. The plate 45 is adapted to bear against the rounded end 15 of the operating arm 14 and it will be obvious that by varying the adjustment of the screw 47, the relative angular relationship of the bearing plate 45 to the lever 43 may be adjusted. The angle between the plate 45 and the arm 14 is an important factor in permitting the relative sliding movement which occurs during application and release of the brakes. By changing the angle of plate 45, any desired degree of rate of release may be secured. It also results in stabilizing the pivot 41. As before, an intermediate lever is provided to carry the pivot 41. Thus I show a bell crank lever 49 mounted on fixed pivot 60, the lever including a downwardly extending arm 50 having mounted therein the pivot 41. Integrally formed with the levers 40 and 49 adjacent the pivot 41 are provided cooperating lugs 51 and 52. Thus the lug 51 is formed integral with the lever 40 while the lug 52 is formed integral with the lever 49.

In Figure 3 the brake applying lever 40 and the supporting lever 49 are shown in "off" position in which the lugs 51 and 52 are in engagement. The lugs are held in engagement by the resistance of the spring 53. In this modification a compression spring is utilized instead of the tension spring shown in Figure 1. The spring 53 is preferably a helically coiled ribbon spring having a definite rate per coil which is dependent upon the pressure desired to be applied to the power arm 14. As one method of supporting the spring 53, I show a lever arm 54 which is integral with lever arm 50 and has formed at its outer end a depending lug 55. Opposite the lug 55 the lever arm 43 has formed thereon a supporting lug 56. The lugs 55 and 56 serve to position spring caps 57 and 58 which hold the helical spring 53 in place. If desirable, a stop member, such as a tubular stop 59, may be mounted within the spring 53 and held against the upper spring cap 57 by the pressure of the spring against a flange of the tubular member. The stop 59 will serve to limit the compression of the spring.

The operation of the brake linkage shown in Figure 3, is illustrated for different positions of the lever members in Figures 6, 7 and 8. The initial movement of the pedal lever 16 will cause the brake linkage to move and take up the slack whereby the movement of the power arm 14 will effect an engagement of the cooperating friction members within the power unit and cause the operation thereof. During this initial movement, the spring 53 is sufficiently stiff to resist compression and the brake applying lever 40, together with the secondary supporting lever 49, will move as a unit about the fixed pivot 60. The position of the parts will then be as shown in Figure 6. Additional pressure upon the pedal 16 will cause the spring 53 to be compressed and the pivot 41 will move in a clockwise direction about the fixed pivot 60 during which movement the lugs 51 and 52 will separate due to the relative movement between the brake applying lever 40 and the secondary lever 49. Since the power arm 14 cannot be further moved, it is apparent that the bearing plate 45 will slide relative to the power arm 14. The pressure which is developed upon the power arm 14 will, therefore, be regulated by the resistance to compression of the spring 53. Figure 7 illustrates the position of the parts after a partial compression of the spring 53.

It will be understood that the force applied to pivot 61 develops horizontal and vertical components of application of pressure from the bearing plate 45 against the power arm 14, the horizontal component will tend to cause relative sliding between the plate 45 and the arm 14. Therefore, by varying the angle of the plate 45, the relation between the components of pressure may be varied.

If the pedal lever 16 is moved sufficiently to cause the engagement of the stop member 59, the parts will be in a position such as illustrated in Figure 8 in which further pressure upon the pedal lever 16 will result in a direct thrust imparted to the arm 14 through the bearing plate 45.

As in the first embodiment described there will be a decreased effective input lever arm during the final stage since the fixed pivot 60 will become the fulcrum. Upon the release of the pedal pressure, the wheel brakes will be released by the pull-back springs and the arm 14 of the power unit will be pulled downward by the spring 62. The pedal 16 may be assisted in its return by the spring 80 which extends from a connection 81 on a fixed part of the frame to the flange 82 of the pedal 16. The spring 80 will tend to bring the stop 38 in engagement with the fixed lug 39 and hold the linkage in completely released position. This is desirable in order to completely release the pressure upon the power arm 14.

Although I have shown in Figure 3 a construction in which the lugs 55 and 56 are integral with the levers for mounting the spring 53 and have used a stop member 59 within the spring to limit the compression thereof, I may instead use a form such as shown in Figure 5. In this figure a lug 73 includes a depending cylindrical portion 74 received in opening 75 formed in the arm 43 of the brake applying lever. The head of the lug 73 forms a seat for the spring clip 58 while the integral lug 55 of the lever arm 54 positions the upper spring clip 57 and the ribbon spring 53 is held between the spring clips. Thus, if it is desired to use a shorter or longer pedal movement, a length of spring may be substituted for the spring in use having a corresponding rate per coil whereby the modulation of the spring resistance is not changed. The different length of spring may be adjusted in its position by substituting a lug 73 which has the desired height of head. The normal position of the brake applying lever and the secondary lever need not be changed. In the construction shown in Figure 5, the internal stop member has not been used since, in some cases, it may be desirable to completely close the ribbon spring and allow the spring itself to act as stop means to prevent further relative movement between the levers thereby the abrupt change in pedal pressure brought about by the change in fulcrums is made somewhat more even.

As illustrating the application of the brake linkage described, I show in Figures 9 and 10 the brake linkage when used in connection with the power device. In these Figures the pedal lever 16 imparts its movement to the brake applying lever 40 which engages the power arm 14 extending from the housing 13 of the power device. The operation of the power device imparts a movement to the lever 69 which has an upper arm connected to the rearwardly extending brake rod 62 and a lower arm connected to the forwardly extending brake rod 65. The rear brake rod 62 transmits its movement to a crank arm 76 which actuates transverse brake rod 77 which effects an actuation of the rear brakes 63 and 64. The forward brakes 66 and 67 are operated in a similar manner by the movement of the forwardly extending brake rod 65. Pull-back springs 85 are shown acting upon the brake shoes to cause their return to released position upon the removal of the pedal pressure. An emergency control lever 68 is provided and is directly connected to the upper end of the lever 69 which is actuated by the power device, as will be apparent in Figure 6.

The same brake linkage may be used without a power device, as illustrated in Figures 12 and 13, in which the brake lever 16 imparts its movement to the brake applying lever 40 which is in thrust engagement with the lever 70 connected to a cross shaft 71. Movable with the cross shaft 71 is the lever 72 to which the rear brake rod 62 may be attached, as before, at the lower end thereof and the front brake rod 65 is attached to the upper end thereof. In this design the emergency lever 68 is directly connected to the lower end of the lever 72 whereby a direct pull may be imparted to the rear brake rod 62.

It will be apparent that in either type of brake control the pedal pressure is first modulated by the resistance of the spring 53 while the brake applying lever is being moved about its pivot 41. Finally when further relative movement of the brake applying lever is prevented by the stop member, the brake applying lever will tend to turn about the fixed pivot 60 thereby resulting in materially increased resistance to the movement of the pedal lever 16.

Various changes and modifications may be resorted to in the particular embodiments of the present improvements without departing from the spirit of the invention as expressed in the appended claims.

I claim:

1. A brake mechanism, comprising a variably operable brake lever, a brake applying lever, a connection between said levers, and means whereby the pressure multiplying leverage of the connection is decreased relative to the brake applying lever during movement in applying the brakes.

2. A brake mechanism, comprising a variably operable brake lever, a brake applying lever, a connection between said levers, and means whereby the pressure multiplying leverage of the connection is changed to require greater application of power to the brake lever as the brake application is increased.

3. A brake mechanism, comprising a variably operating brake lever, a brake applying lever, a connection between said levers, a pair of axes of rotation for the brake applying lever, one of said axes being closer to the point of connection to the lever from the brake lever, and means whereby the rotation of the brake applying lever, is transferred to the closer axis during the braking operation.

4. A brake mechanism comprising a pivoted variably operable brake lever, a second pivoted lever, a brake applying bell crank lever, a brake arm, one arm of the bell crank lever engaging the brake arm, a link connecting the other arm of the bell crank lever and the brake lever, and a spring resisting movement of the second pivoted lever in one direction.

5. A brake mechanism comprising a variably operable brake lever, brake applying mechanism, means connecting the brake lever and mechanism, and means whereby power from the brake lever is transmitted to the brake applying mechanism through one input lever arm during part of the movement of the brake lever and through a materially shorter input lever arm during the remainder of the braking movement.

6. A brake mechanism comprising a variably operable brake lever, brake applying mechanism, means connecting the brake lever and mechanism, means whereby power from the brake lever is transmitted to the brake applying mechanism through one input lever arm during part of the movement of the brake lever and through a materially shorter input lever arm during the remainder of the braking movement, and means cushioning the transfer of power from one lever arm to the other.

7. Brake mechanism comprising a variably operable member, a brake applying lever member, linkage connecting said members, an additional lever movable about a fixed pivot, said additional lever carrying a pivot movable therewith spaced from said fixed pivot and serving as a pivot point for said brake applying lever member, and means associated with said levers adjacent their pivotal connection for limiting the relative movement therebetween.

8. Brake mechanism comprising a variably operable member, a brake applying lever member, linkage connecting said members, an additional lever movable about a fixed pivot, said additional lever carrying a pivot movable therewith spaced from said fixed pivot and serving as a pivot point for said brake applying lever member, means associated with said levers adjacent their pivotal connection limiting the relative movement therebetween and spring means associated with said levers normally tending to impart relative movement thereto.

9. Brake mechanism comprising a variably operable member, a brake applying lever member, linkage connecting said members, an additional lever movable about a fixed pivot, said additional lever carrying a pivot movable therewith spaced from said fixed pivot and serving as a pivot point for said brake applying lever member, a pair of oppositely disposed lugs on said levers and spring resistance means held between said lugs.

10. Brake mechanism comprising a variably operable member, a brake applying lever member, linkage connecting said members, an additional lever movable about a fixed pivot, said additional lever carrying a pivot movable therewith spaced from said fixed pivot and serving as a pivot point for said brake applying lever member, a link connection between said levers, said link having a slotted connection at one end thereof permitting limited relative movement between said levers in one direction.

11. Brake mechanism comprising a variably operable member, a brake applying lever member, linkage connecting said members, an additional lever movable about a fixed pivot, said additional lever carrying a pivot movable therewith spaced from said fixed pivot and serving as a pivot point for said brake applying lever member, a tension spring extending between said levers and a slotted link extending between said levers parallel to said spring, said link allowing a limited relative movement between said levers in a direction opposed to the resistance of the spring.

12. Brake mechanism comprising a variably operable member, a brake applying lever member, linkage connecting said members, means for actuating the brakes from the movement of said brake-applying lever member, said lever member including an operating arm having a flat bearing face, an arm connected to said actuating means, said arm having a rounded end in thrust engagement with said flat bearing surface and means for adjusting the normal angular relation between said flat bearing surface and said operating arm.

13. Brake mechanism comprising a variably operable member, a brake applying lever member, linkage connecting said members, said lever member including an operating arm, a bearing plate pivoted to said arm, means for adjusting the normal angular relation between said bearing plate and said lever member, means for actuating the brakes by movement of said lever member, said means including an operating arm having a rounded end normally in thrust engagement with said bearing plate.

14. Brake mechanism comprising a variably operable member, a brake applying lever member, linkage connecting said members, an additional lever pivoted at a fixed point carrying a pivot for said brake applying lever member, means for actuating the brakes from the movement of said brake applying lever member, said means including an arm in thrust engagement with an arm of said lever member, said lever arm having a flat bearing surface arranged to contact with the rounded end of said operating arm and means for varying the normal angularity between said flat bearing surface and said operated arm.

15. Brake mechanism including in combination, a pedal control, a power brake unit, said power brake unit having input and output lever arms, a brake applying lever, said brake applying lever being mounted by a free pivot and including arms extending from said free pivot, a connection between the pedal control and one of the arms of said brake applying lever, the other of the arms of said brake applying lever having a flat bearing face in thrust engagement with said input arm, said free pivot permitting movement of said pedal control and relative sliding movement between said bearing face and said input arm after said input arm has been moved to actuate said power unit.

16. Brake mechanism including in combination a pedal control, a power brake unit, said power brake unit having input and output lever arms, a brake applying lever, said brake applying lever being mounted by a free pivot and including arms extending from said free pivot, a connection between the pedal control and one of the arms of said brake applying lever, the other of the arms of said brake applying lever having a flat bearing face in thrust engagement with said input arm, said free pivot permitting movement of said pedal control and relative sliding movement between said bearing face and said input arm after said input arm has been moved to actuate said power unit, and means initially resisting the tendency of said brake applying lever to move about said free pivot whereby a direct leverage thrust is developed on said input arm.

17. Brake mechanism comprising sets of forward and rear brakes, a power braking unit, an output lever extending from said power unit, brake linkage extending from the forward to the rear brakes connected to said output lever, an input lever arm extending from said power unit, a pedal lever and means for transmitting an initial thrust to said input arm from the movement of said pedal lever to apply the brakes, said means permitting further movement of the pedal lever while said input arm remains stationary.

18. Brake mechanism comprising sets of forward and rear brakes, a power braking unit, an output lever extending from said power unit, brake linkage extending from the forward to the rear brakes connected to said output lever, an input lever arm extending from said power unit, a pedal lever and means for transmitting an initial thrust to said input arm from the movement of said pedal lever to apply the brakes, said means permitting further movement of the pedal lever while said input arm remains stationary, and means for finally transmitting a direct thrust to said input arm upon the full movement of said pedal lever.

19. Brake mechanism comprising in combination, wheel brakes, a power brake device for applying the wheel brakes, pedal control for said power device, means directly transmitting the initial movement of said pedal control to effectuate the actuation of said power device and means limiting the initial pressure developed by direct pedal control upon the power device.

20. Brake mechanism comprising wheel brakes and a pedal control for said wheel brakes, brake linkage between said pedal control and said wheel brakes, means included in said brake linkage initially transmitting the movement of said pedal control to directly apply the brakes with a relatively light pressure, said means being operative upon further movement of said pedal control to apply an increasing braking pressure regulated by spring resistance, and means limiting the spring resistance control whereby, upon the full movement of said pedal control, a direct thrust is transmitted through said brake linkage.

21. Brake mechanism comprising a pedal lever, a brake applying lever, connections between said levers, a brake lever arm, wheel brakes operated by a full movement of said brake lever arm, said brake applying lever including a lever arm in thrust engagement with said brake lever arm, a floating pivot for said brake applying lever, the initial movement of said pedal lever causing said floating pivot to move in one direction while said brake applying lever is non-rotative with respect thereto and the full movement of said brake lever arm is obtained, further movement of said pedal lever causing said floating pivot to move in the opposite direction while sliding occurs between said brake applying lever and said brake lever arm.

22. Brake mechanism comprising a pedal lever, a brake applying lever, connections between said levers, a brake lever arm, wheel brakes operated by a full movement of said brake lever arm, said brake applying lever including a lever arm in thrust engagement with said brake lever arm, a floating pivot for said brake applying lever, the initial movement of said pedal lever causing said floating pivot to move in one direction while said brake applying lever is non-rotative with respect thereto and the full movement of said brake lever arm is obtained, further movement of said pedal lever causing said floating pivot to move in the opposite direction while sliding occurs between said brake applying lever and said brake lever arm, resilient means permitting relative rotation between said brake applying lever and said floating pivot during the opposite movement thereof and means limiting the resilient movement whereby a final direct thrust is obtained from said pedal lever to said brake lever arm.

23. Brake operating mechanism comprising a pivoted brake applying arm having a thrust-receiving end, a pivoted brake applying member adapted to be variably controlled by the operator, a pair of relatively movable members having a fixed reaction point for movement as a unit with respect thereto by said operator-controlled member, one of said relatively movable members having a thrust-imparting portion for engagement with the thrust-receiving portion of said brake applying arm, resilient means between said relatively movable member tending to resist relative movement with respect to the fixed reaction point whereby movement of said operator-controlled member initially moves said relatively movable members as a unit for imparting movement to said brake applying arm and the yielding of said resilient means permits continued movement of said operator-controlled member causing relative movement of said relatively movable members without imparting appreciable further movement to said brake applying arm.

24. Brake operating mechanism comprising a pivoted brake pedal, a pivoted brake applying arm having a thrust-receiving portion adapted to be actuated through movement of the pedal, a fixed pivot, a member pivotally carried thereby, a second member pivotally carried by said first mentioned member, said first mentioned member being connected to said pedal and having a thrust-imparting portion for engaging said thrust-receiving portion of said arm and resilient means between said members tending to oppose relative movement therebetween with respect to said fixed pivot.

25. In a brake operating mechanism, a modulator interposed between the brake applying member and the brake to be operated thereby, said modulator comprising members pivotally connected together, and spring means contacting with at least one of said members to vary the manual effort applied to said brake applying member during the movement of same to apply said brake.

Signed at Chicago, Illinois, this 16th day of May, 1929.

EDWARD A. ROCKWELL.